(12) United States Patent
Ceroll et al.

(10) Patent No.: US 9,238,270 B2
(45) Date of Patent: Jan. 19, 2016

(54) BIT RETAINING SYSTEM FOR ROTARY TOOL

(71) Applicant: Black & Decker Inc., Newark, DE (US)

(72) Inventors: Warren A. Ceroll, Owings Mills, MD (US); Gregory K. Griffin, Humboldt, TN (US); Steven D. McDaniel, Humboldt, TN (US); Craig A. Schell, Street, MD (US); Robert S. Gehret, Hampstead, MD (US); Joseph P. Kelleher, Parkville, MD (US)

(73) Assignee: BLACK & DECKER INC., Newark, DE (US)

( * ) Notice: Subject to any disclaimer, the term of this patent is extended or adjusted under 35 U.S.C. 154(b) by 139 days.

(21) Appl. No.: 14/189,021

(22) Filed: Feb. 25, 2014

(65) Prior Publication Data

US 2014/0374998 A1 Dec. 25, 2014

Related U.S. Application Data

(63) Continuation of application No. 12/706,288, filed on Feb. 16, 2010, now Pat. No. 8,678,725.

(60) Provisional application No. 61/207,675, filed on Feb. 13, 2009.

(51) Int. Cl.
*B23C 1/20* (2006.01)
*B27C 5/10* (2006.01)
*B23B 31/20* (2006.01)
(Continued)

(52) U.S. Cl.
CPC .............. *B23B 31/20* (2013.01); *B23B 31/201* (2013.01); *B23B 45/006* (2013.01); *B23B 2231/2081* (2013.01); *B23B 2231/2083* (2013.01); *B23B 2260/07* (2013.01); *B23C 1/20* (2013.01); *B25B 33/005* (2013.01); *B27C 5/10* (2013.01); *Y10T 279/17299* (2015.01); *Y10T 279/17504* (2015.01); *Y10T 279/27* (2015.01); *Y10T 279/32* (2015.01); *Y10T 279/3431* (2015.01); *Y10T 279/3451* (2015.01); *Y10T 408/04* (2015.01); *Y10T 408/953* (2015.01); *Y10T 409/306608* (2015.01); *Y10T 409/309408* (2015.01)

(58) Field of Classification Search
CPC ................... Y10T 279/3431; Y10T 279/3437; Y10T 279/3443; Y10T 279/3451; Y10T 279/17299; Y10T 279/17504; B23B 45/006; B25B 33/005
USPC ............. 279/147, 148, 149, 150, 134, 42, 48; 409/231–232, 181–182; 144/136.95, 144/154.5
See application file for complete search history.

(56) References Cited

U.S. PATENT DOCUMENTS 1,489,976 A 4/1924 Brown
1,831,225 A 11/1931 Bogart
(Continued)

*Primary Examiner* — Erica E Cadugan
(74) *Attorney, Agent, or Firm* — Rhonda L. Barton

(57) ABSTRACT

A bit retaining system for a rotary tool or device such as a router is disclosed. The bit retaining system may include a collet assembly and a control assembly. The collet assembly may include a spindle, a collet adapted to receive the bit, and a collet nut. The collet assembly may further include a collet gear mounted on the collet nut and/or a spindle gear mounted on the spindle. The control assembly selectively engages the collet assembly to drive the collet nut and/or secure the spindle in a fixed position, preventing its rotation. In operation, a hand tool is utilized to engage the control assembly. This configuration enables a user to capture and release the rotary tool bit using one hand.

11 Claims, 15 Drawing Sheets

(51) Int. Cl.
  *B23B 45/00* (2006.01)
  *B25B 33/00* (2006.01)

(56) References Cited

U.S. PATENT DOCUMENTS

| | | |
|---|---|---|
| 1,874,888 A | 8/1932 | Burrell |
| 1,886,224 A | 11/1932 | Redinger |
| 1,915,705 A | 6/1933 | Webb |
| 1,971,537 A | 8/1934 | Sloan et al. |
| 1,974,385 A | 9/1934 | Whiton |
| 2,224,633 A | 12/1940 | Highberg et al. |
| 2,257,921 A | 10/1941 | Sloan et al. |
| 2,265,238 A | 12/1941 | Koehler |
| 2,333,180 A | 11/1943 | Holmes |
| 2,345,069 A | 3/1944 | Phillips |
| 2,374,725 A | 5/1945 | Blake, Jr. |
| 2,538,251 A | 1/1951 | Kahle et al. |
| 2,618,995 A * | 11/1952 | Droege ............ B25B 33/005 81/16 |
| 2,690,690 A * | 10/1954 | Garton ............ B25B 33/005 81/16 |
| 2,807,732 A * | 9/1957 | Kurtovich ........ B23B 45/006 173/164 |
| 2,839,953 A | 6/1958 | Hanger |
| 3,882,758 A | 5/1975 | Muller |
| 4,218,165 A | 8/1980 | Riddersholm |
| 4,324,512 A | 4/1982 | Siroky |
| 4,526,497 A | 7/1985 | Hatfield |
| 4,536,113 A | 8/1985 | Hatfield |
| 4,938,490 A | 7/1990 | Bosek |
| 5,009,539 A | 4/1991 | Muellenberg |
| 5,511,801 A | 4/1996 | Kanaan et al. |
| 6,042,310 A | 3/2000 | Campbell et al. |
| 6,224,304 B1 | 5/2001 | Smith et al. |
| 6,270,086 B1 | 8/2001 | Lloyd |
| 7,168,900 B2 | 1/2007 | Neumeier |
| 8,678,725 B2 * | 3/2014 | Ceroll ............ B23B 31/201 279/134 |

\* cited by examiner

BIT RETAINING SYSTEM FOR ROTARY TOOL

CROSS REFERENCE TO RELATED APPLICATIONS

This application claims priority to U.S. Provisional Patent Application No. 61/207,675, filed on Feb. 13, 2009, and entitled "Router", and U.S. patent application Ser. No. 12/706,288, filed Feb. 16, 2010, entitled "Router". The disclosures of these applications are hereby incorporated by reference in their entirety.

FIELD OF THE INVENTION

The present invention is directed toward a system for releasably securing a cutting tool to a rotary device and, in particular, to a bit retaining system that secures a bit to a router.

BACKGROUND OF THE INVENTION

Rotary tools, such as drills or routers, include a tool retainer or holder that non-rotatably secures a rotary bit (e.g., a cutting tool such as a drill bit or a router bit) to a driving device that rotates a drive shaft. The rotation of the drive shaft causes a corresponding rotation of the rotary bit; consequently, the clamping force of the retainer must provide sufficient gripping action of the bit. Otherwise, the bit will slip in its holder, resulting in poor tool performance, as well as creating a hazard to those working near the tool.

Bit retainer systems for woodworking, metalworking, and the like have been developed. Common types of bit holders include collet systems or chucks. Collets require a substantial amount of torque to be exerted on a threaded retainer or spindle in order to attain sufficient clamping force on the bit. This preloads the system such that the frictional engagement between the collet and the cutting tool limits movement therebetween.

FIG. 1 is a perspective view of a rotary tool 100 (e.g., a router) including a conventional bit retaining system. As shown, the rotary tool 100 includes a motor housing 105, a bit retaining assembly 110, and spindle lock assembly 115. The bit retaining assembly 110 includes a spindle 120 with a collet 125, and a collet nut 130 threadingly engaging the spindle 120. Rotating the collet nut 130 displaces the nut along the spindle axis, which, in turn, narrows and widens the opening of the collet 125.

The spindle lock assembly 115 selectively secures the spindle 120 to enable the rotation of the collet nut 130. Engaging an actuator 140 activates a lock that prevents the rotation of spindle 120, which in turn, permits the rotation of the collet nut 130 with respect to the spindle 120. In operation, a user first engages the lock assembly actuator 140 with one hand to secure spindle 120. Using a second hand, the user rotates the collet nut 120 with a wrench to widen (loosen) or narrow (tighten) the collet to remove or secure the bit as needed.

Thus, when changing the bit of a router, it is necessary to utilize two hands—one to engage the locking mechanism and one to tighten or loosen the bit within a router collet. It is often desirable to quickly attach the bit to the rotary tool or to quickly remove the bit from the tool. For example, several router bits may be needed throughout the course of shaping a single work piece with a router; consequently, it would be desirable to change the bits quickly and efficiently. This process of utilizing multiple hands for changing the bits is inefficient and thus undesirable because of the additional time and effort required for attaching the bits to and removing the bits from the collet. Furthermore, in order to attain the high torque necessary to achieve proper clamping force collet systems typically require the use of a nut wrench that rotates the collet nut to release or capture the bit. This use of conventional wrenches to displace the collet nut is not only cumbersome, but often proves ineffective since the effective clamping force is dependent on the torque applied by the individual operator, which varies from one person to another.

Therefore, there is a need for a bit retaining system for a rotary tool that is operated utilizing a single hand, and which provides adequate torque to non-rotatably retain a cutting tool (such as a router bit) with minimal force applied by an operator.

SUMMARY OF THE INVENTION

The present invention is directed to a bit retaining system for a rotary tool such as a router. In one embodiment, the bit retaining system includes a collet assembly and a control assembly. The collet assembly includes a spindle, a collet mounted in the spindle that is adapted to receive a bit, and a collet nut that alters the internal dimensions of the collet to capture the bit therein. The collet assembly may further include a collet gear mounted on the collet nut and/or a spindle gear mounted on the spindle. The control assembly selectively engages the collet assembly to drive the collet nut relative to the spindle. In operation, a hand tool is utilized to engage the control assembly. A bias member biases an engagement portion of the control assembly away from the collet assembly. However, the engagement portion is engaged with the collet assembly when the user urges the tool to overcome the bias force. A turning force is simultaneously applied to the urging force to cause relative rotation of the spindle and collet nut. This configuration enables a user to capture and release the rotary tool bit using one hand.

BRIEF DESCRIPTION OF THE DRAWINGS

FIG. 7A illustrates the displaceable gear in its normal, disengaged position, while FIGS. 7B-7C show the displaceable gear in its engaged position in which it meshes with the collet gear.

Like reference numerals have been used to identify like elements throughout this disclosure.

DETAILED DESCRIPTION OF THE INVENTION

Figure 1:
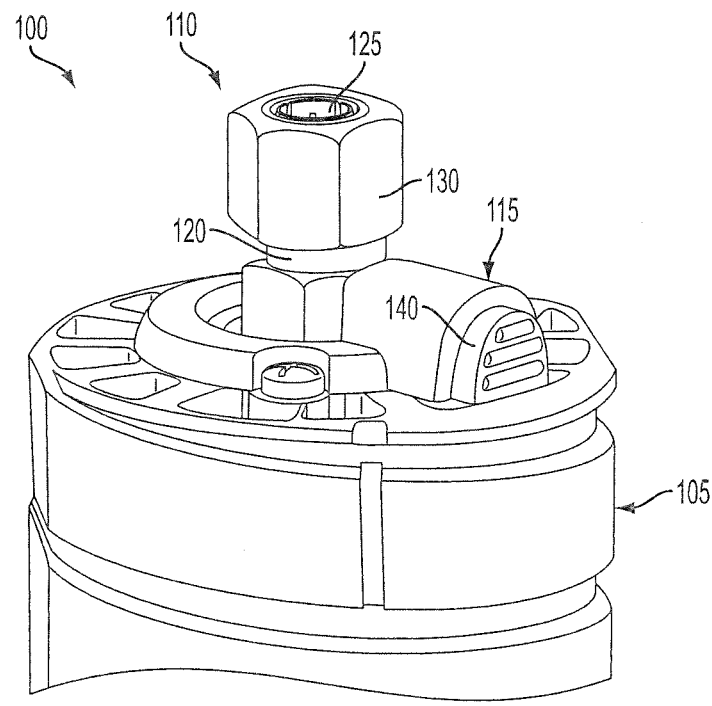
FIG. 1 illustrates a perspective view of a rotary tool including a conventional bit retaining system.
Figure 2:
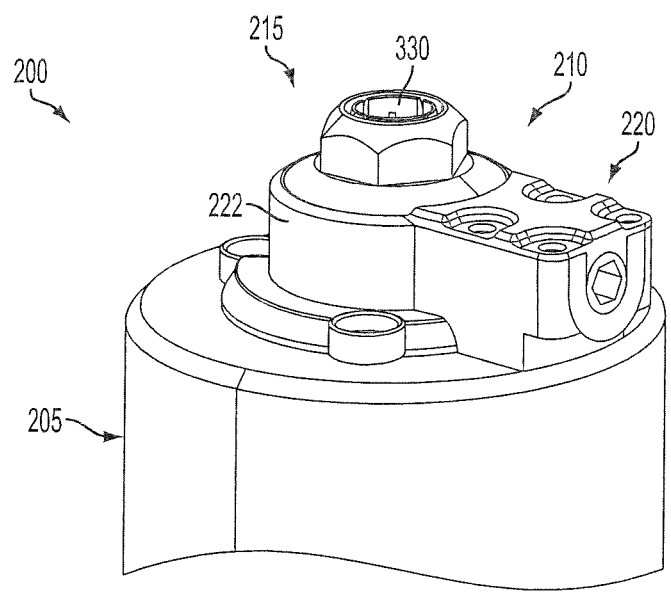
FIG. 2 illustrates a perspective view of a rotary tool including a bit retaining system in accordance with an embodiment of the invention.
Figure 3:
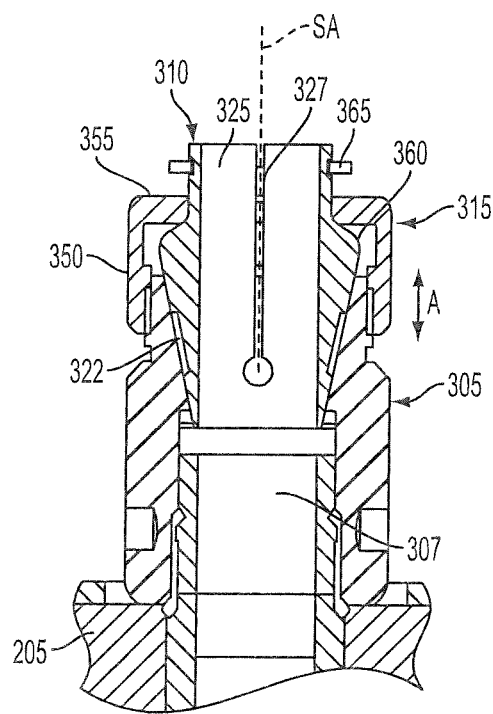
FIG. 3 illustrates an isolated, cross sectional view of the collet assembly shown in FIG. 2, with the collet and spindle gears removed for clarity.

FIGS. 2 and 3 illustrate a rotary tool including a bit retaining system in accordance with an embodiment of the present invention. Referring to FIG. 2, the rotary tool 200 (e.g., a router) with a motor housing 205 and a bit retaining system 210 including a collet assembly 215 in selective communication with a control assembly 220 disposed in a system housing 222. Referring to FIG. 3, the collet assembly 215 includes a spindle 305, a collet 310, and collet nut 315. The spindle 305, which may generally define a right cylinder, extends distally from the motor housing 205 from a generally centrally location thereon. The distal portion of the spindle 305 is externally threaded to engage complementary threads on the collet nut 315.

The spindle 305 defines an interior channel 322 that tapers radially inward in the direction of the motor housing 205 to define a spindle channel having a generally frustoconical shape. The collet 310 is received in the channel 322 such that it is generally coaxial with the spindle 305. The collet 310 includes a plurality of fingers 325 having slots 327 formed therein. The fingers 325 define a generally cylindrical bore or opening 330 operable to receive the shank portion of a bit (e.g., a router bit). The collet 310, moreover, is adapted to move axially into and out of the spindle channel 322. With this configuration, drawing the fingers 325 outward (axially out of the channel 322) widens the diameter of the bore 330 by expanding the slot 327. Conversely, drawing the fingers 325 inward (axially into the spindle channel 322) narrows the diameter of the bore 330 by compressing the slot 327. In this manner, the fingers 325 may be compressed to provide adequate clamping force secure a bit within the tool.

The spindle 305 is coupled to the rotor of the motor by an armature shaft 307. By way of example, the spindle 305 may be fixedly connected to the shaft 307 via a pin, screw, etc. Specifically, the spindle and shaft 307 rotate coaxially about a generally vertical spindle axis SA.

The collet nut 315 includes a side wall 350 and an upper wall or flange 355 defining a generally annular opening that permits passage of the collet 310 and the bit shank therethrough. The collet nut 315 axially captures the collet 310 within the spindle 305. For example, the flange 355 of the collet nut 315 may engage shoulders 360 and/or tabs 365 formed into the outer surface of the collet 310. Alternatively, the collet 310 may include a notch formed into the collet perimeter that receives the end of flange 355 extending from the collet side wall 350. The collet nut 315 is internally threaded with threads complementary to the threads formed on the surface of the spindle 305. Consequently, rotating the collet nut 315 about the spindle axis displaces the nut axially along the longitudinal axis of the spindle 305 (indicated by arrows A).

With the above described configuration, rotating the collet nut 315 in one direction drives the nut toward the distal end of the spindle 305. The collet nut 315 engages the tabs 365 to draw the collet 310 axially outward from the spindle channel 322. Conversely, rotating the collet nut 315 in an opposite direction draws the collet nut 315 toward the spindle proximal end. The collet nut 315 engages the shoulders 360 axially urge the collet 310 inward, into the spindle channel 322. As noted above, drawing the collet 310 into and out of the spindle channel 322 alters the diameter of the collet bore 330, widening and narrowing the collet bore to selectively secure and release the shank of the bit.

Figure 4A:
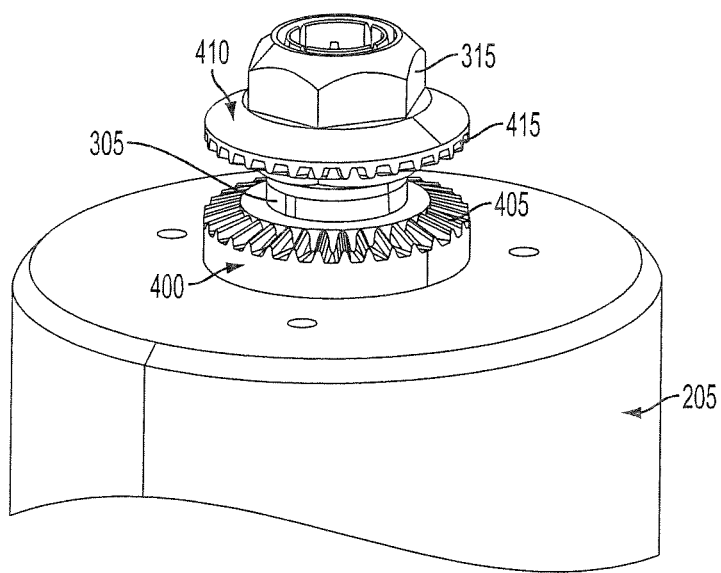
FIG. 4A illustrates the bit retaining system shown in FIG. 2 with the housing removed for clarity, showing a perspective view of the collet assembly.

Referring to FIG. 4A, the collet assembly 215 further includes a spindle gear 400 and a collet gear 410 that cooperate with the control assembly 220 to selectively engage and disengage the shank of a bit positioned within the collet. As shown, the spindle gear 400 is longitudinally spaced from the collet gear 410 along the spindle 305, with each gear being generally coaxial with the spindle. The spindle gear 400 may be fixedly attached to or integral with the spindle 305, and may be in the form of a generally annular bevel gear having a plurality of teeth 405 disposed about the circumference of the spindle, and oriented to face away from the motor housing 205 (i.e., toward the collet gear 400). Alternatively, the spindle gear 400 may be fixed to motor housing 205 with spindle 305 rotatable therein. Similarly, the collet gear 410 may be fixedly attached to or integral with the collet nut 315, and may be in the form of a generally annular bevel gear having a plurality of teeth 415 disposed about the circumference of the collet nut 315, and oriented to face toward the motor housing 205 (i.e., toward the spindle gear 400). The spindle gear 400 and the collet gear 410 may possess the same number of teeth 405, 415, as well as the same tooth geometry and size.

Figure 4B:
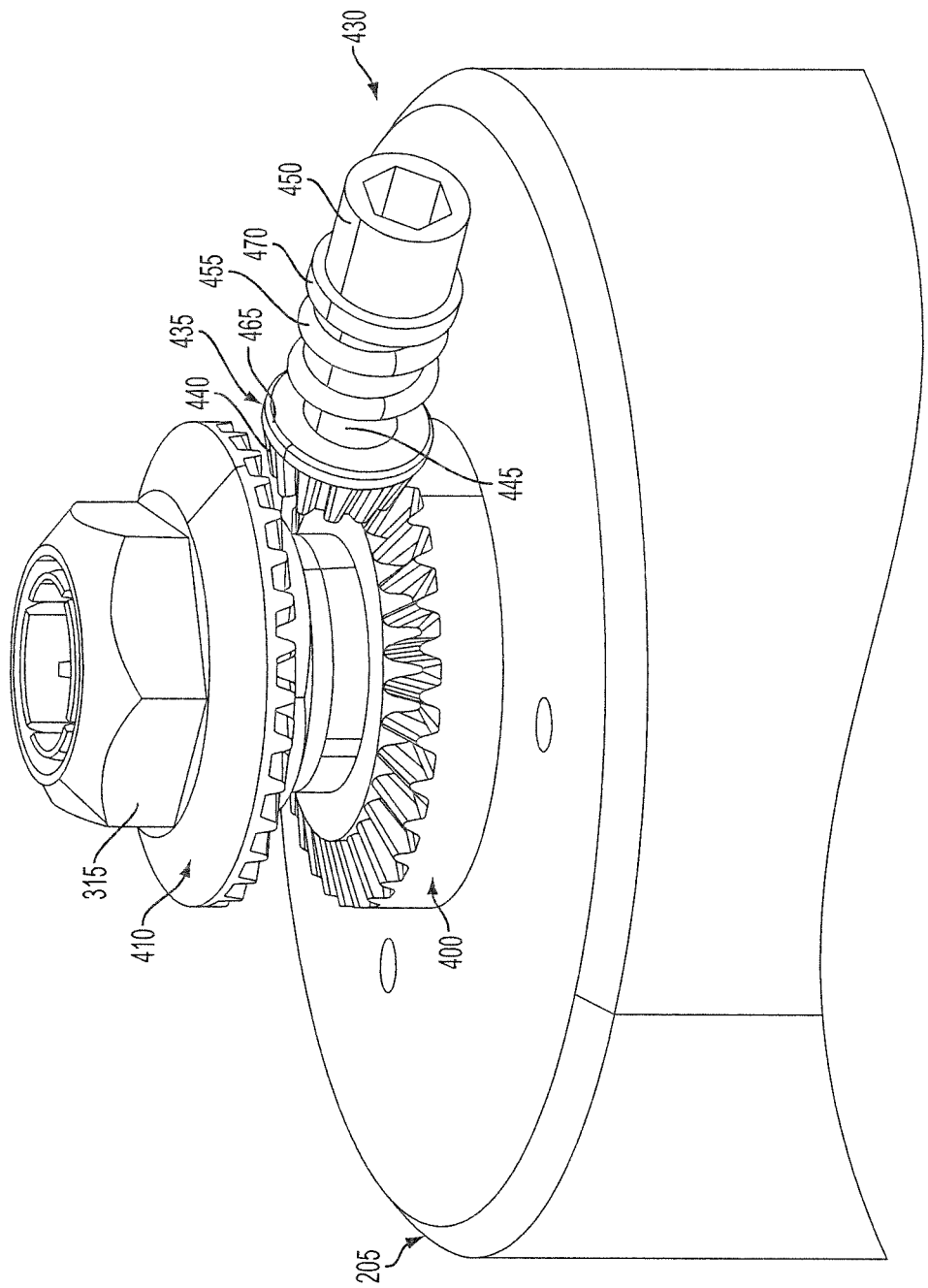
FIG. 4B illustrates the bit retaining system of FIG. 2 with the housing removed for clarity, showing the assembly of FIG. 4A and a control gear from the control assembly.

The control assembly 220 is configured to selectively engage the gears 410, 400 of the collet assembly 215 and, in particular, to drive the relative rotation of the spindle 305 and collet nut 315. Referring to FIG. 4B, the control assembly 220 includes a laterally displaceable control gear 430 adapted to selectively engage the spindle gear 400 and collet gear 410. Specifically, the control gear 430 may be in the form of a bevel gear having a generally frustoconical head portion 435 with teeth 440 proportionally sized to simultaneously mesh with the teeth 405 of the spindle gear 400 and the teeth 415 of the collet gear 410. The overall dimensions of the head portion 435 of the control gear 430 may be smaller or larger than that of the spindle gear 400 and the collet gear 410 to improve torque generation.

A generally cylindrical shaft 445 extends distally from the head portion 435. A socket 450, disposed at the shaft distal end, is configured to receive a hand operated tool. By way of example, the socket 450 may in the form of a shaped receptacle that is keyed to receive a tool such as a hex wrench. A biasing member 455 (e.g. a compression spring) is wrapped around an intermediate portion of the shaft 440, being captured between a lip 465 defined by the head portion 435 and a shoulder 470 defined by the socket 450.

Figure 5A:
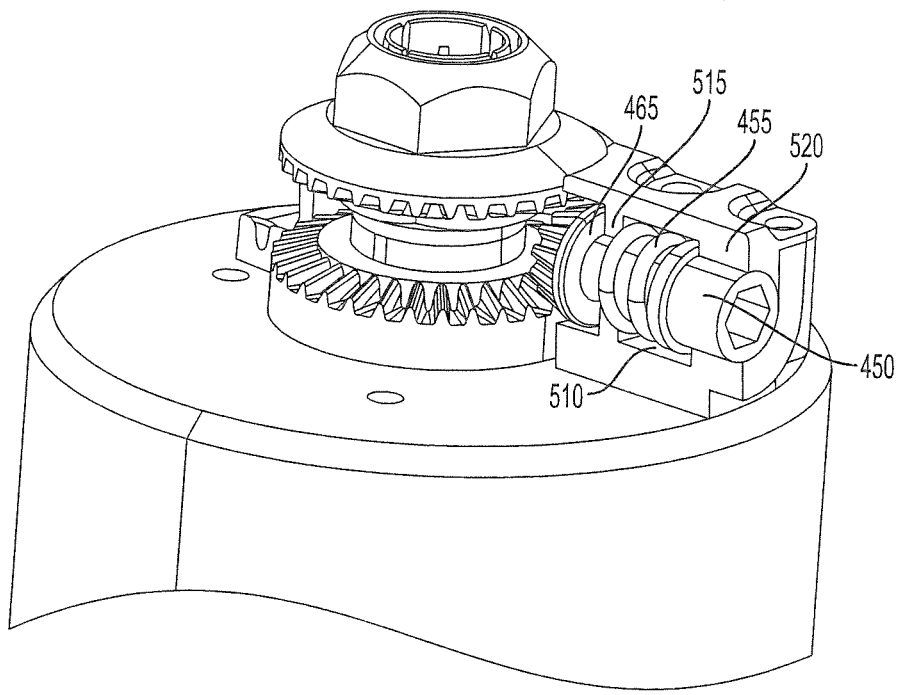
FIG. 5A illustrates the bit retaining system of FIG. 2, with a portion of the housing removed for clarity, showing the control gear disengaged from the gears of the collet assembly.
Figure 5B:
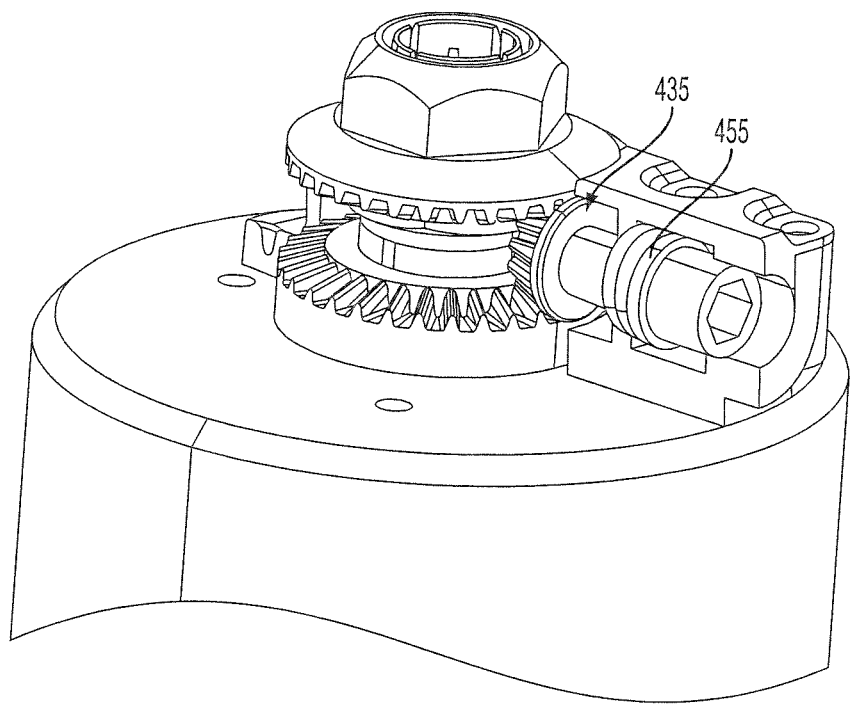
FIG. 5B illustrates the bit retaining system of FIG. 2, with a portion of the housing removed for clarity, showing the control gear engaged with the gears of the collet assembly.

Referring to FIGS. 5A and 5B, the system housing 222 includes a cavity 510 that constrains the lateral movement of the control gear 430. Specifically, the cavity 510 is defined by a first or forward wall 515 and a second or rearward wall 520. The first wall 515 includes an opening that is generally aligned with an opening in the second wall 520. The openings permit the shaft 445 of the control gear 430 to slide within the cavity 510 toward and away from the spindle 400 and collet gears 410. Specifically, the control gear 430 is configured to move laterally along a generally horizontal control gear axis that is oriented generally orthogonal to the generally vertical spindle axis SA to selectively engage and disengage the spindle gear 400 and collet gear 410. In addition, the openings permit the control gear 430 to rotate about the control gear axis.

This axial movement of the control gear 430 is constrained by interaction between the walls 515, 520 of the cavity 510 and the lip 465 and shoulder 470 portions of the control gear 430. That is, the first wall 515 functions as a stop, preventing the forward/inward movement of shoulder 470 of control gear 430. Similarly, the second wall 520 functions as a stop, preventing the rearward/outward movement of the control gear 430 beyond the lip 465 defined by the head portion 435. With this configuration, the control gear 430 may be displaced along its axis toward the spindle 305 by applying a force sufficient to overcome the biasing force applied by the biasing member 455. Biasing member 445 is disposed between wall 515 and shoulder 470 to biases control gear 430 back into a rest position away from collet assembly 215.

Specifically, the control gear 430 may be selectively moved from a first, disengaged position, to a second, engaged position. The operation of the device is explained with reference to FIGS. 5A, 5B, and 5C. The control assembly 215 begins in is normal, disengaged position (FIG. 5A). That is, the biasing member 455 biases the control gear 430 outward such that the teeth 440 of the head portion 435 are not meshed with the teeth 405 of the spindle gear 400 or with the teeth 415 of the collet gear 410. As a result, the spindle 305 may be rotated by the motor without affecting the security of the bit within the bit retaining assembly.

Figure 5C:
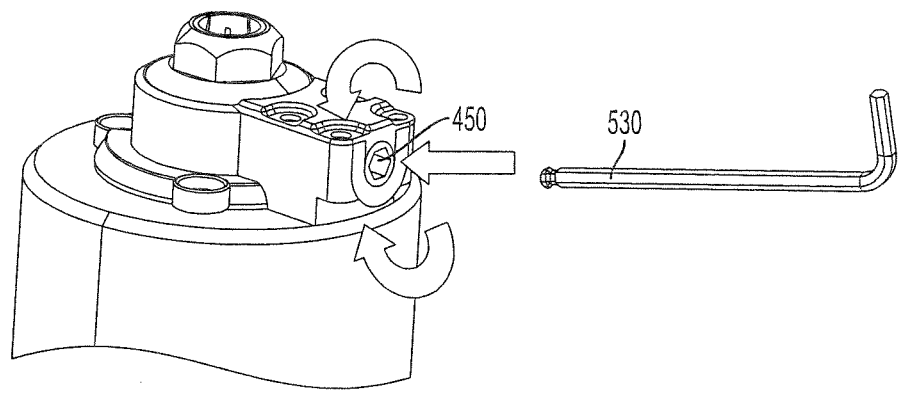
FIG. 5C illustrates the bit retaining system of FIG. 2, showing the operation of the system utilizing a hand operated tool.

To tighten or loosen the collet 310, a hand operated tool 530 (e.g., a hex wrench) is inserted into the socket 450. Specifically, the hand operated tool is inserted axially into the socket 450, along the control gear axis oriented generally perpendicular to the spindle axis SA. The tool is utilized to apply a horizontal force to control gear 430 that overcomes the biasing force of the biasing member 455 (FIG. 5C). The force drives the control gear 430 laterally along the control gear axis until the teeth 440 on the head portion 435 are in meshed engagement with the teeth 405, 415 of the spindle gear 400 and collet gear 410, respectively (FIG. 5B). Once meshed, the hand operated tool 530 is rotated, which, in turn, rotates the control gear 430 about the control gear axis. Rotating the hand operated tool 530 causes the spindle gear 400 and the collet gear 410 to rotate in opposite directions about the spindle axis SA. For example, the collet gear 410 may rotate in a clockwise direction while the spindle gear 400 rotates in a counter clockwise direction (and vice versa). Consequently, the spindle 305 is rotated in a first direction (via the spindle gear 400) while the collet nut 315 rotates in the opposite direction (via the control gear 410). In this manner, the collet nut 315 is driven axially along the spindle 305 to expand or compress the fingers 325 as described above.

Figure 6A:
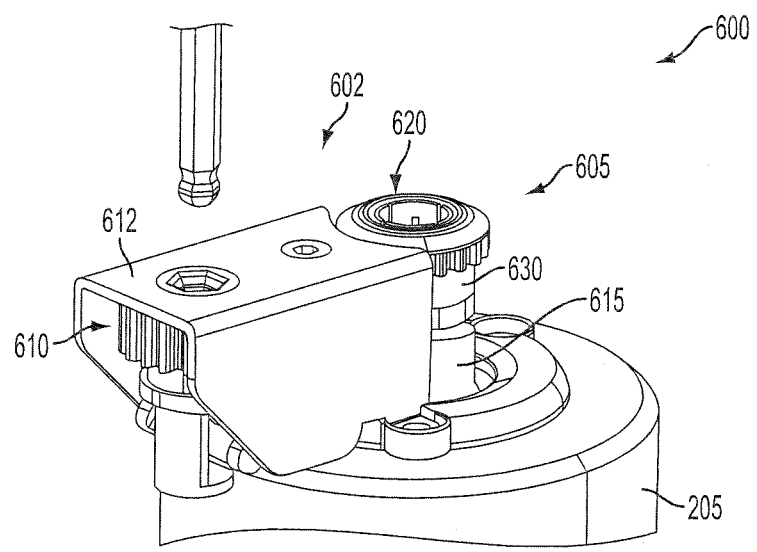
FIG. 6A illustrates a perspective view of a rotary tool including a bit retaining system in accordance with another embodiment of the invention.
Figure 6B:
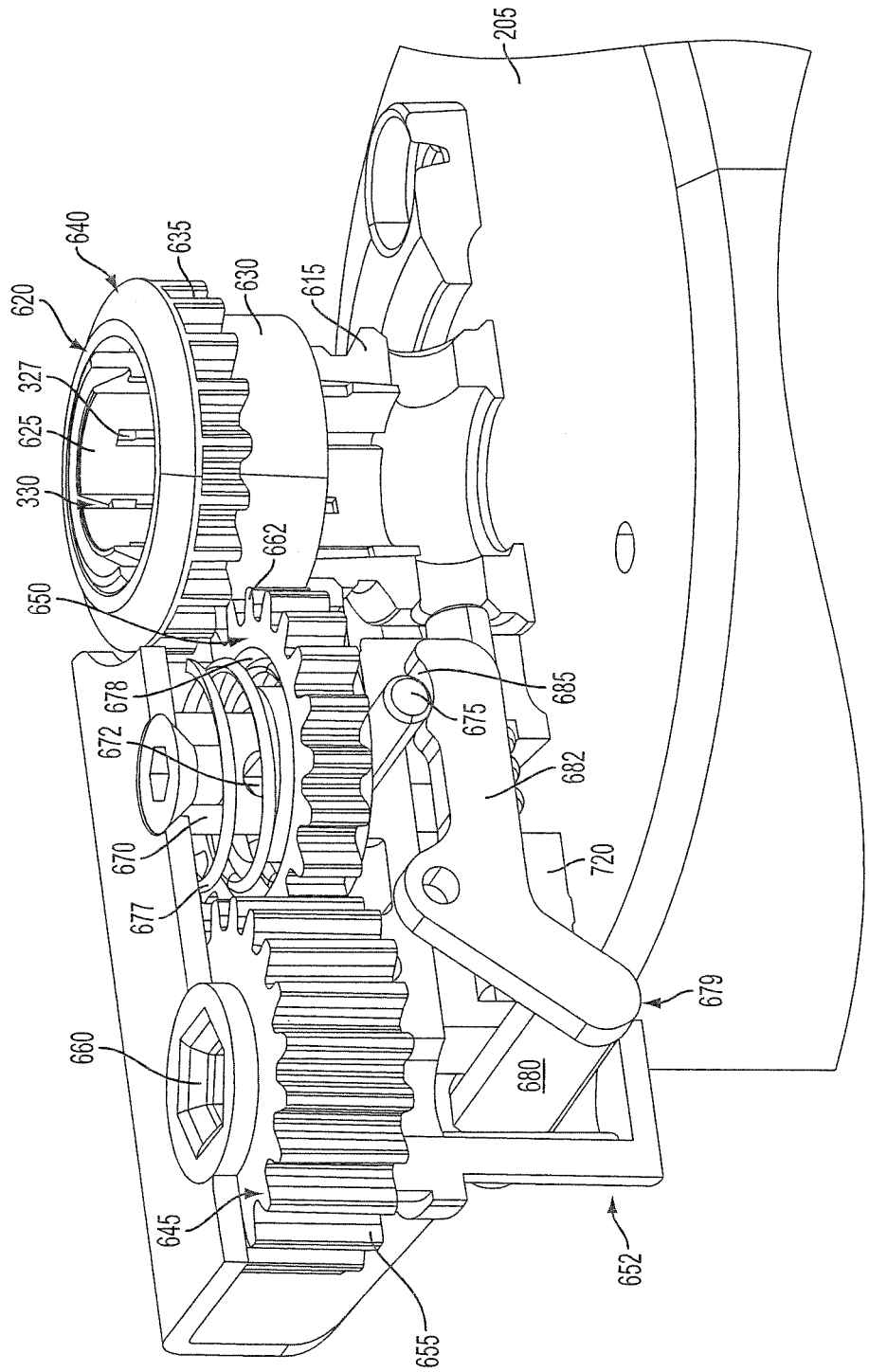
FIG. 6B illustrates the bit retaining system of FIG. 6A, with a portion of the housing removed for clarity.

FIGS. 6A and 6B illustrate a rotary tool including a bit retaining system in accordance with another embodiment of the invention. As illustrated, the rotary tool 600 includes a bit retaining system 602 including a collet assembly 605 and a transmission assembly 610 disposed on housing 205. The collet assembly 605 includes spindle 615, a collet 620 formed of fingers 625, and a collet nut 630. The spindle 615, which may be in communication with a motor housed in the motor housing 205, is configured to rotate about a central axis (also called a spindle axis SA, seen best in FIG. 7A). As in the assembly described above, the collet nut 630 threadingly engages the spindle 615 such that the collet nut moves axially along the spindle 615, selectively altering the diameter of the collet bore 330 based upon its longitudinal position on the spindle. The collet nut 630 further includes a plurality of teeth 635 extending radially from its exterior surface, about the circumference of the nut, to define a collet gear 640.

The transmission assembly 610 includes a control gear 645 meshed with a repositionable intermediate gear 650, as well as a carriage assembly 652. The control gear 645 may be a generally annular spur gear including teeth 655 extending about the gear periphery. The control gear 645 further includes a central socket 660 in the form of a shaped receptacle configured to receive and frictionally engage a hand operated tool (seen in FIGS. 7A and 7B). For example, the socket 660 may be a receptacle having a generally hexagonal cross section that engages a hex key. The socket 660 defines a central channel that passes completely through the control gear 645, permitting the key to extend axially therethrough. The entrance to the socket 660 may further include lead-in chamfers to guide key into the socket. The control gear 645 is adapted to rotate about a central axis (also called a control gear axis) that is oriented generally parallel to the spindle axis SA.

The intermediate gear 650 may be a generally annular spur gear including teeth 662 adapted to engage not only the teeth 655 of the control gear 645, but also the teeth 635 of the collet gear 640. As shown in the figures, the height/thickness of the intermediate gear 650 may be about half the height of the control gear 645. The intermediate gear 650 rotates about a central axis (also called an intermediate gear axis) that is oriented generally parallel to the spindle axis SA.

In addition, the intermediate gear 650 is repositionable along the central intermediate gear axis such that it selectively engages and disengages the collet gear 640. Specifically, the intermediate gear 650 is mounted on a yoke or axle 670 extending through the center aperture of the gear. The yoke 670 includes an elongated slot 672 through which a support rod 675 passes. The support rod 675, oriented below the intermediate gear 650, is oriented substantially orthogonal to the central axis of the intermediate gear 650. The support rod 675 is configured to move along the slot 672, supporting the intermediate gear 650 as it travels from a first/lower slot position to a second/upper slot position, and vice versa. A biasing member 677 (e.g., a compression spring) is seated within an annular recess 678 formed into the intermediate gear 650. The biasing member 677 biases the intermediate gear 650 in a normal, disengaged position in which the intermediate gear is not oriented in the same plane as the collet gear 640.

The transmission assembly 610 further includes a shift fork 679 that selectively drives the intermediate gear 650 into engagement with the collet gear 640. Specifically, the shift fork 679 has a generally U-shaped structure defined by a transverse bar or ramp 680 and a pair of rails 682 extending outward from the transverse bar 680. Each rail 682 includes a depression 685 that cradles the support rod 675. The shift fork 679 is pivotally coupled to the carriage assembly 652 along a pivot point P to define a pivot axis that is oriented generally orthogonal to one or more of the gear axes. With this configuration, applying a downward pressure to the transverse bar 680 generates a counterclockwise rotation in the shift fork 679 (from the viewpoint of FIG. 7A), which moves the rail 682 upward to drive the intermediate gear 650 upward along the yoke 670, against the biasing force of the biasing member 677. Upon release of the pressure, the biasing member 677 drives the intermediate gear 650 back to its normal position.

Figure 7A:
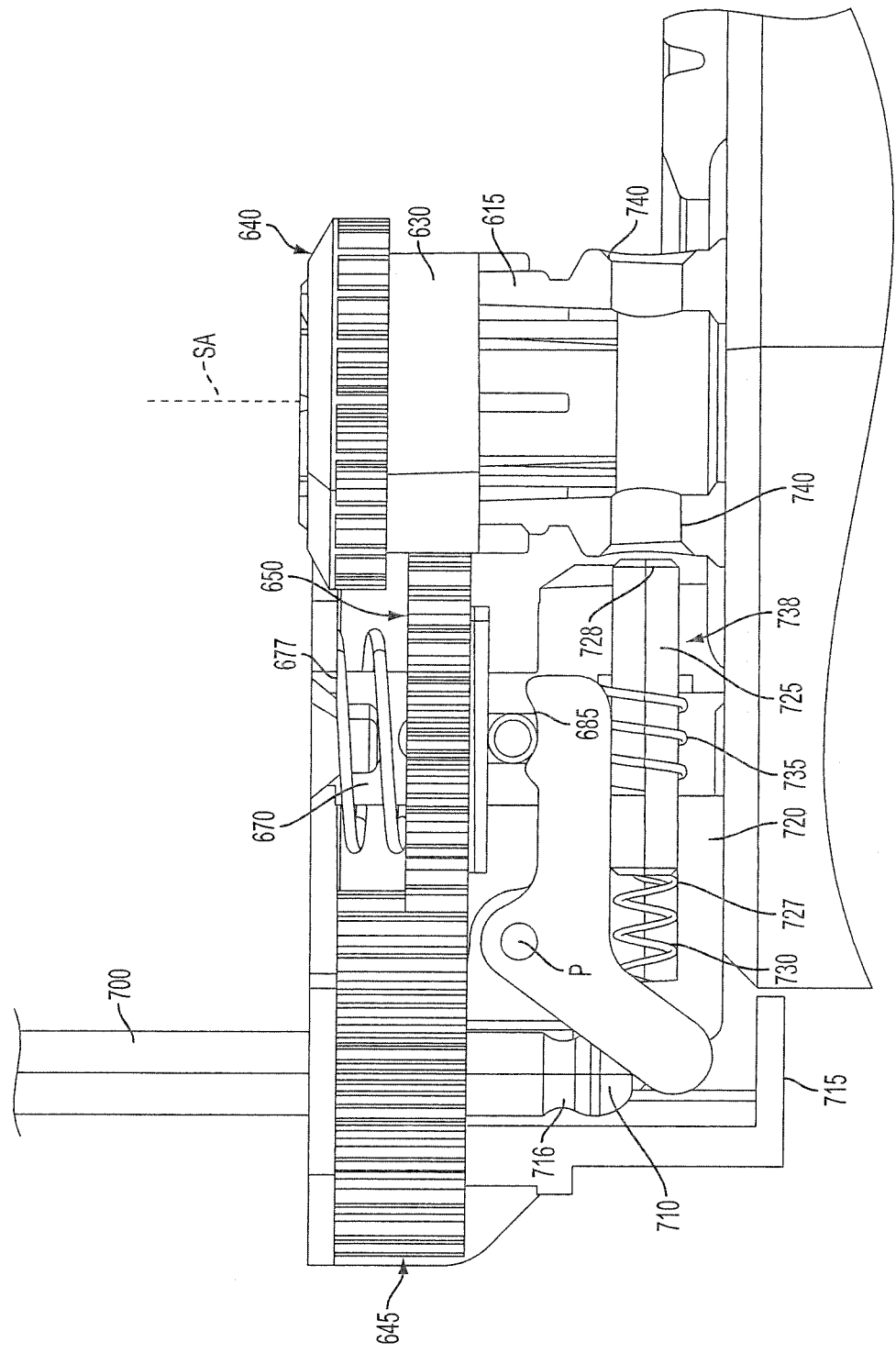
FIGS. 7A, 7B and 7C illustrate front views of the bit retaining system of FIG. 6A with a portion of the housing removed, showing the operation of the system. Specifically.
Figure 7B:
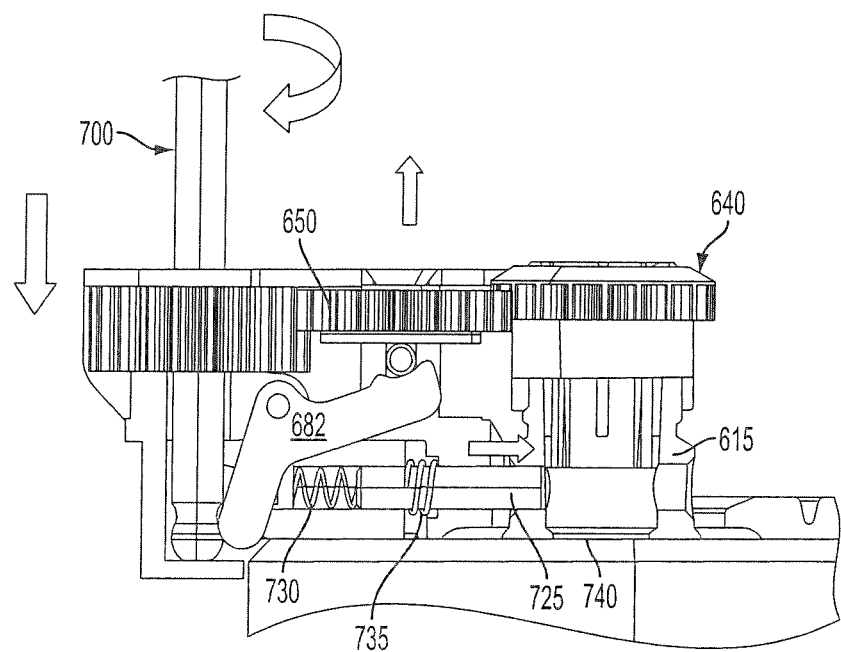
Figure 7C:
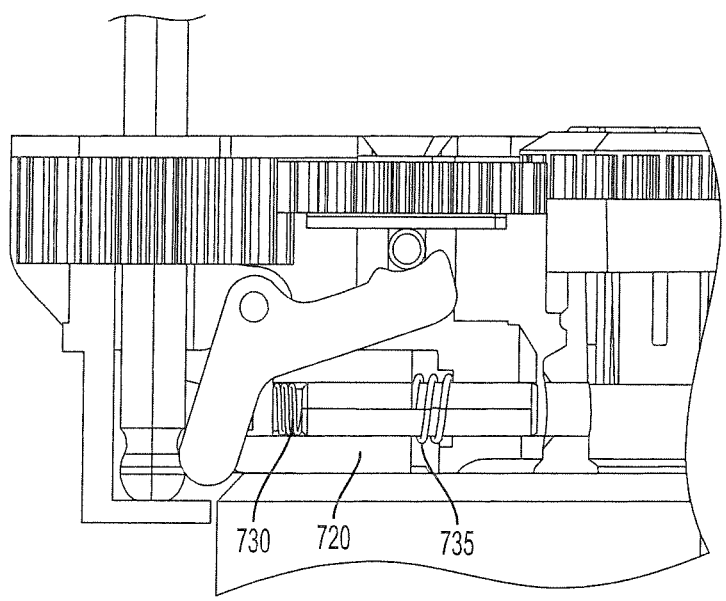

The operation of the device is explained with reference to FIGS. 7A, 7B and 7C. The bit retaining system initially begins in its normal, disengaged position (FIG. 7A). In this position, the intermediate gear 650, while meshed with the control gear 645, is disengaged from the collet gear 640. As a result, the collet assembly 605 is free to rotate (driven by the motor) without altering the compression force applied by the collet 620. A hand operated tool 700 (e.g., a tool operable to apply torque such as a hex key) is inserted through the opening of the socket 660. Specifically, the hand operated tool 700 is inserted into the control gear along an axis that is generally parallel to the spindle axis SA. This axial insertion of the hand operated tool 700 causes the end 710 of the tool to contact the transverse bar 680 of the shift fork 679, pivoting the rail 682 upward as described above. This, in turn, drives the intermediate gear 650 upward along its central axis and into meshed engagement with the collet gear 640. The hand operated tool 700 may be inserted through the control gear 645 until it engages a carriage shoulder 715 that functions as a stop, preventing over insertion of the tool. The tool may also include a recess 716 into which the transverse bar 680 is seated when the tool 700 is properly positioned within the socket 660. Once engaged, torque from the hand operated tool 700 can be transferred to the collet gear 640. Since the intermediate gear 650 is aligned with the collet gear 640 in the engaged position, rotating the control gear 645 about its central axis rotates the intermediate gear 650 about its central axis. This, in turn, rotates the collet gear 640 and the attached collet nut 630 about the spindle axis SA.

If the spindle 615 is not secured from rotation, rotating the hand operated tool 700 will also rotate the spindle, preventing the rotation of the nut 630 with respect to the spindle. Thus, in addition to repositioning the intermediate gear 650, the shift fork 679 further activates a spindle lock mechanism that secures the spindle 615 to prevent its rotation. Referring to FIG. 7A, the carriage assembly 652 further includes a C-shaped, translating sled 720 that houses a generally cylindrical pin 725 having a proximal end 727 and a distal end 728. The proximal end 727 of the pin 725 is coupled to a first biasing member or extension spring 730 that biases the pin toward the spindle 615. In addition, the intermediate portion of the pin 725 is coupled to a second biasing member or retraction spring 735 seated within an annular recess 737 formed around a window 738.

In the disengaged position (i.e., when the hand operated tool 700 is not completely engaged with the shift fork), the retraction spring 735 drives the pin 725 away from the spindle 615, orienting the sled 720 in spaced relation from the window 738. Inserting the hand operated tool 700 into engagement with the transverse bar 680 of the shift fork 679 drives the sled 720 forward to overcome the biasing force of the retraction spring 735 (since the extension spring 730 is stiffer than the retraction spring 735). That is, the sled 720 is driven toward the window 738 by the shift fork 679 when engaged The sled 720 acts upon the extension spring 730 which, in turn, acts upon the pin 725, driving it toward the spindle 615 and compressing the retraction spring 735 as seen in FIG. 7B. The retraction spring 735 ensures that pin 725 never extends into notch 740 when the tool is turned on (i.e., the rotor is powered to operate).

As a result, the pin 725 passes through the window 738, contacting the spindle 615. The spindle 615 includes one or more notches 740 that are adapted to receive the distal end 728 of the pin 725. If the notch 740 is not aligned with the pin 725, the extension spring 730 flexes (compresses) to prevent damage to the spindle 615 (as seen in FIG. 7C). To align one of the notches 740 with the pin 725, the user simply rotates the hand operated tool 700, which causes the spindle 615 to rotate as explained above due (e.g., to friction between the threads of the collet nut 315 and the sindle 615). Once aligned, the pin 725 is urged into the notch 740 by the extension spring 730. When positioned within the notch 740, the rotational position of the spindle 615 is fixed, thereby preventing spindle rotation about the spindle axis SA. Any additional torque applied to the control gear 645 will rotate the collet gear (and thus the collet nut), but not the spindle 615.

Thus, once the hand operated tool 700 is fully engaged with the shift fork 679, the spindle 615 is secured in a fixed position by the engagement of the pin 725 with the notch 740. The hand operated tool 700 is then rotated, thereby rotating the control gear 645. The rotary motion of the control gear 645 is transferred through the intermediate gear 650 to the collet gear 640. This rotation causes the axial movement of the collet nut 630 along the spindle 615, which, in turn, compresses or releases the collet 620 to tighten or loosen its hold on the shank of a rotary tool bit as described above.

Upon removal of the hand operated tool 700, the retraction spring 735 drives the pin 725 and the sled 720 away from the spindle 615. The pin 725 is drawn out of the notch 740 and the sled 700 is returned to its normal position. The above described configuration provides a bit retaining assembly with one-handed operation, since the hand operated tool simultaneously locks the spindle and rotates the collet nut to expand or constrict the collet. In addition, this configuration permits a user to insert the hand operated tool 700 along an axis that is generally parallel to the spindle axis SA (i.e., the axis of spindle rotation), which is typically easier for the user.

Figure 8:
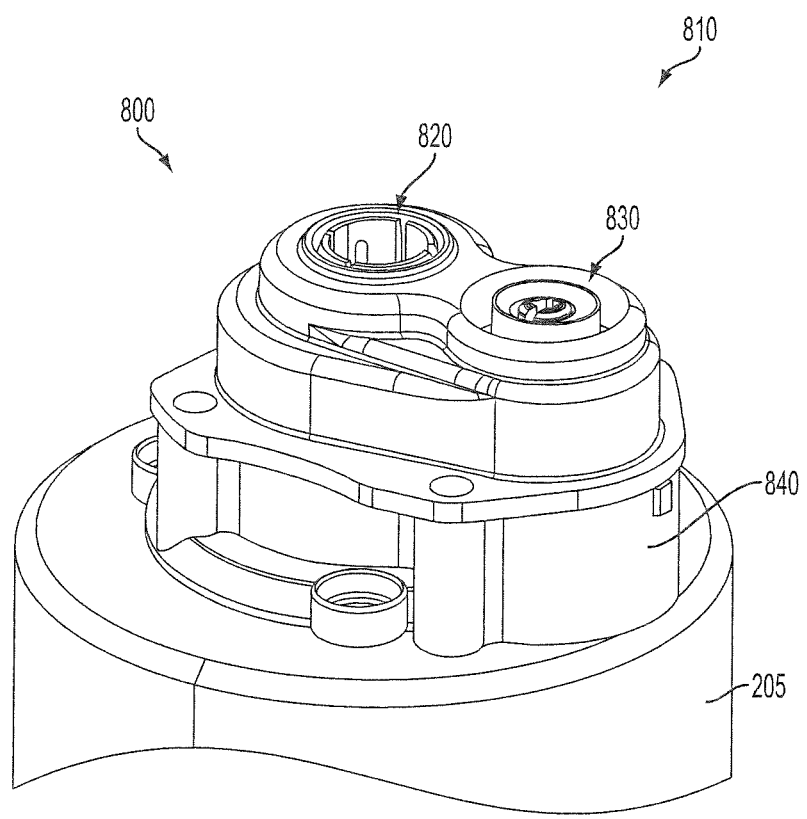
FIG. 8 illustrates a perspective view of a rotary tool including a bit retaining system in accordance with another embodiment of the invention.
Figure 9A:
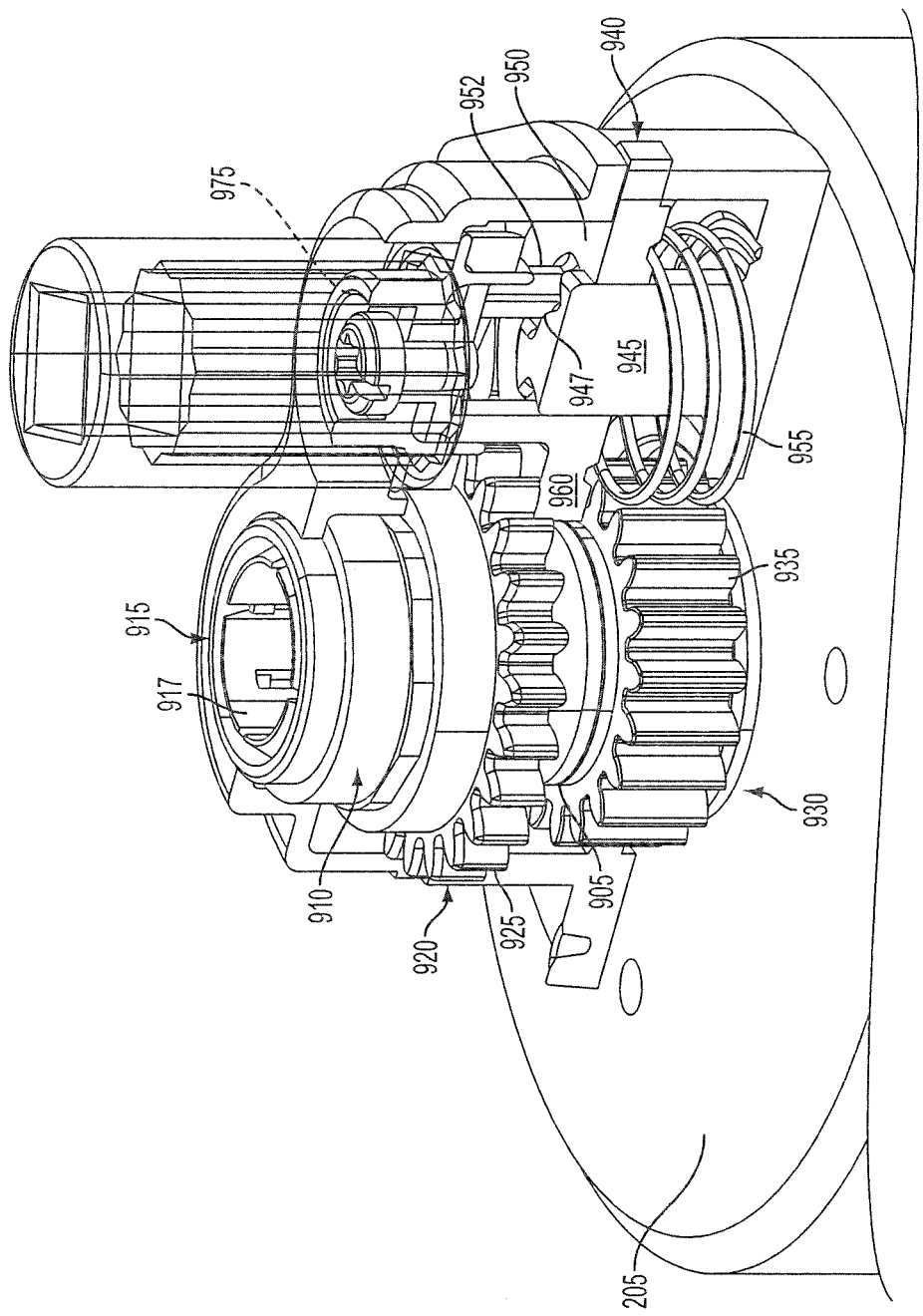
FIG. 9A illustrates the bit retaining system of FIG. 8, with a portion of the housing removed for clarity, showing the control assembly disengaged from the collet assembly.
Figure 9B:
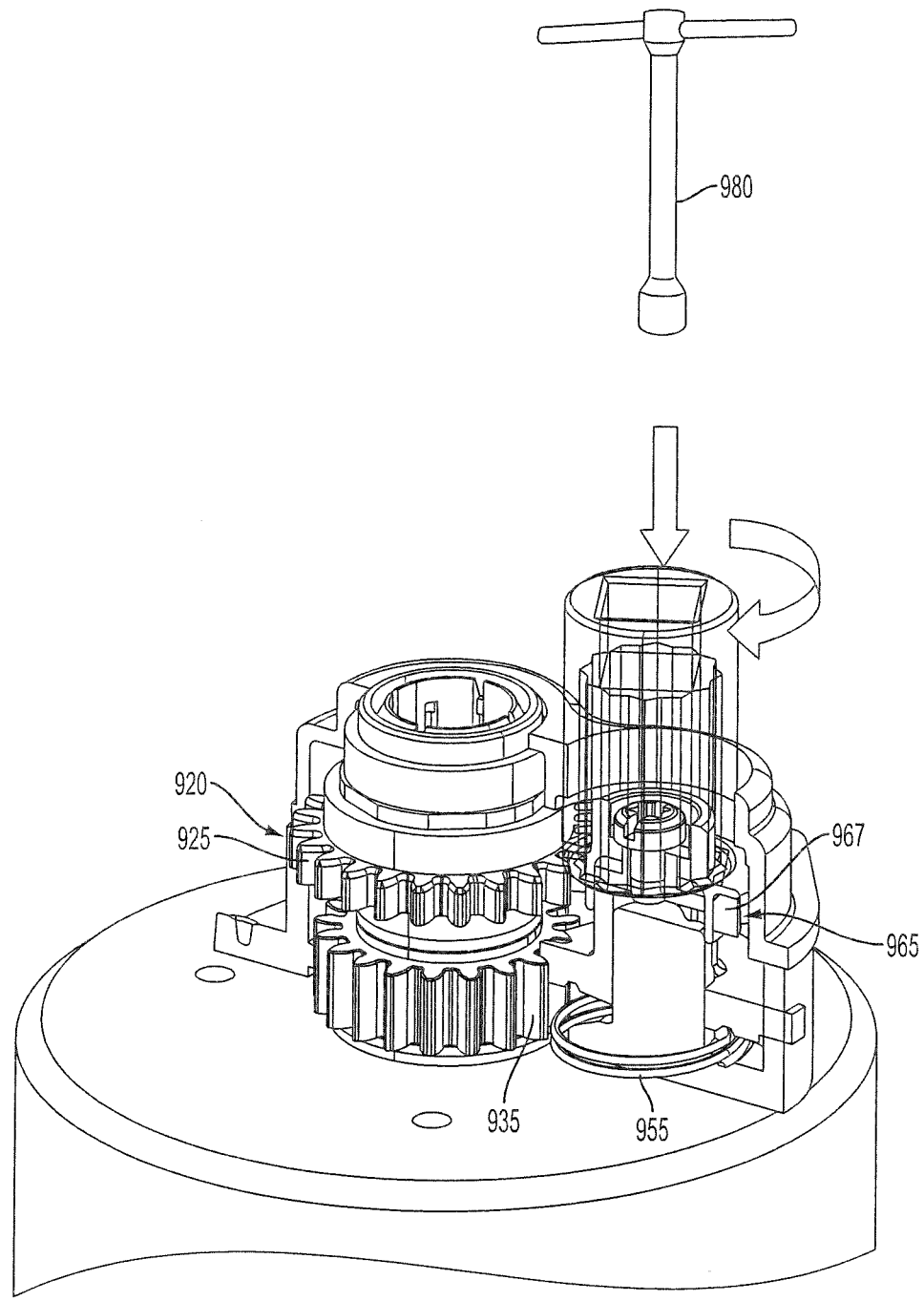
FIG. 9B illustrates the bit retaining system of FIG. 8, with a portion of the housing removed for clarity, showing the control assembly engaged with the collet assembly.
Figure 9C:
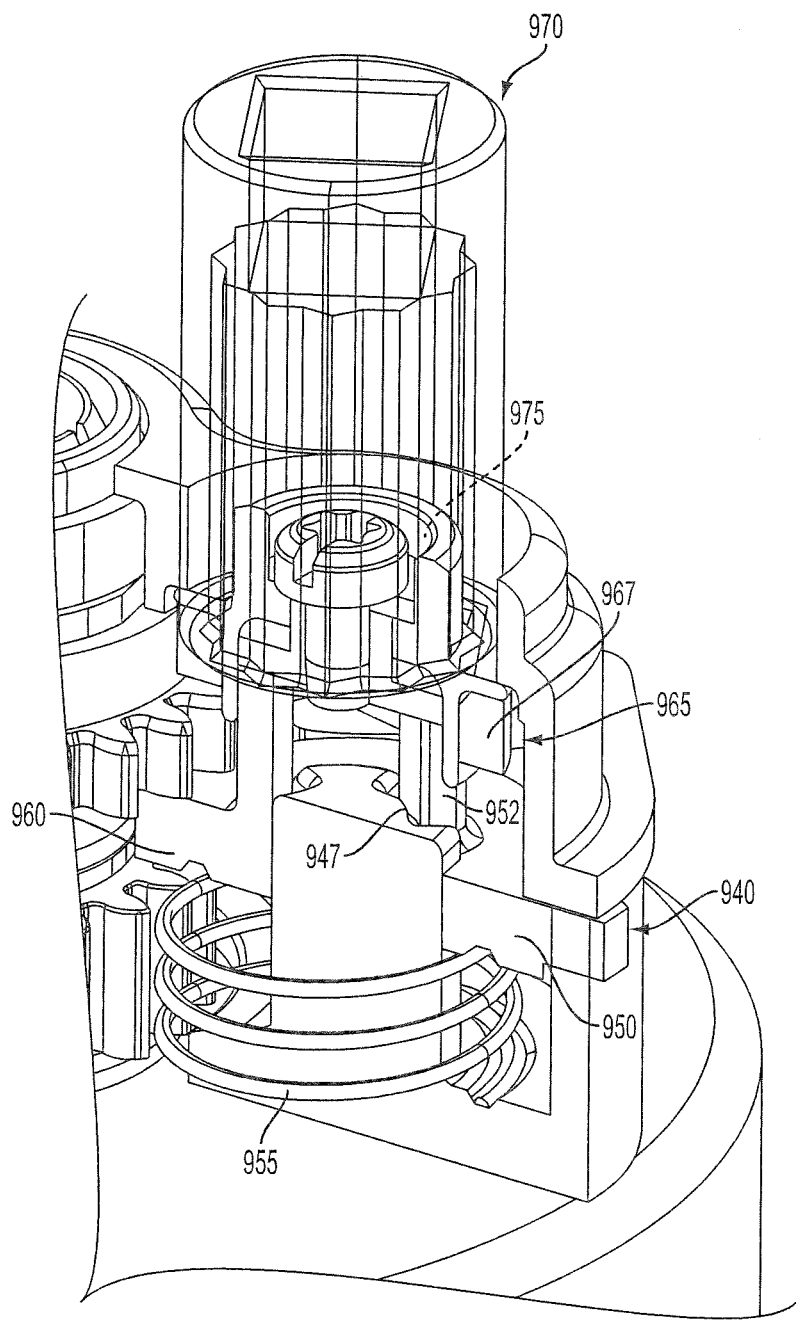
FIG. 9C illustrates a close-up view of the control assembly shown in FIGS. 9A and 9B.

FIGS. 8, 9A, 9B, and 9C illustrate a bit retaining system in accordance with another embodiment of the invention. Referring to FIG. 8, a rotary tool 800 includes bit retaining system 810 including a collet assembly 820 and a control assembly 830 disposed within a housing 840. As shown in FIGS. 9A-9C, the collet assembly 820 may include a generally cylindrical spindle 905 extending distally from the motor housing 205 that rotates about a generally vertical spindle axis. As with the above embodiments, the collet assembly 820 includes an internally threaded collet nut 910 that engages the external threads formed on the perimeter of the spindle 905. Furthermore, a collet 915 is mounted within the spindle 905. The collet 915 includes fingers 917 adapted collapse and expand depending on the axial position of the collet nut 910 with respect to the spindle 905, as described above.

A collet gear 920 is attached to or integrated with the collet nut 910. The collet gear 920 may be a generally annular spur gear including a plurality of teeth 925, extending radially from the collet nut 920, that are spaced about the collet nut circumference. A spindle gear 930 is longitudinally spaced from the collet gear 920 such that it is located proximate the motor housing 205. The spindle gear 930, which is attached to or otherwise integrated into the spindle 905, may be a generally annular spur gear including a plurality teeth 935 extending radially from the spindle 905, which are spaced about the spindle circumference. As shown, the gears 920, 930 are generally coaxial with the axis of the spindle 905.

The control assembly 830 includes a displaceable carriage or sled 940 slidingly mounted on a support post 945 (support shown in cross section in FIGS. 9A-9C). The support post includes a plurality of circumferentially spaced guide notches 947 running axially along the post. The carriage 940 includes a base 950 and a series of legs 952 extending distally (upward from the viewpoint of FIG. 9A) from the base. The legs 952 are configured to slide along the guide notches 947. In one embodiment, the lateral dimensions of the legs 952 may be slightly smaller than the width of the guide notches 947. This permits slight rotational movement of the carriage 940 with respect to the support 945. By way of example, the carriage 940 may rotate the angle of one gear tooth when turned by a tool. This permits automatic adjustment of the gear positions to provide alignment. Alternatively, a user may manually rotate the carriage 940 to align the gears. The carriage 940 is biased towards a normal, disengaged position by a biasing member 955 (e.g., a compression spring). With this configuration, the carriage 940 rides axially along the support post 945, being biased toward normal position.

The carriage 940 further includes a tab 960 extending radially from the base 950 that is configured to mesh with the teeth 935 of the locking gear 930. In addition, the carriage 940 includes a control gear 965 supported on the legs 952 that is adapted to rotate with respect to the carriage 940. Specifically, the carriage 940 remains in a generally fixed rotational position while the control gear 965 rotates about an axis generally aligned with the axis of the support post 945. The control gear 965 includes a plurality of teeth 967 adapted to mesh with the teeth 920 of the collet gear 925.

The control assembly 830 further includes a guide socket 970 that leads to a key or receptacle 975 in communication with the control gear 965. The receptacle 975 may be keyed to mate with a hand tool such as a lug wrench. With this configuration, mating a tool with the receptacle 975 and rotating the tool causes a corresponding rotation of the control gear 965.

The operation of the device is explained with reference to FIGS. 9A and 9B. The control assembly 830 begins in its first, normal position, in which the carriage 940 is positioned such that the locking tab 960 on the base 950 is disengaged from the teeth 935 of the spindle gear 930 (FIG. 9A). In addition, in the normal position, the control gear 965 does not lie in the same plane as the collet gear 920; consequently, the gears 920, 965 are not meshed when the carriage 940 is in its normal position and the hand operated tool 800 is permitted to rotate without affecting the securing of the bit within the collet. A hand operated tool 980 operable to apply torque is inserted axially into the guide socket 970 until it engages and becomes properly seated on the receptacle 975. The hand operated tool 980 is urged axially, toward the motor housing 205. This, in turn, overcomes the biasing force applied to the carriage 940 by the biasing member 955, driving the carriage 940 toward the motor housing 205 (FIG. 9B).

As the carriage 940 is driven toward the motor housing 205, the carriage 940 may automatically rotate a predetermined amount to properly seat the tab 960 extending radially from the base 950 between adjacent teeth 935 on the spindle gear 930 (described above). Alternatively, the user may slightly rotate the hand operated tool 980 to align the gear teeth. When the carriage 940 reaches its lowermost position, the tab 960 meshes with the teeth 935 of the spindle gear 930. In addition, the teeth 967 of the control gear 965 mesh with the teeth 925 of the collet gear 920. Rotating the tool 980 causes a corresponding rotation in the control gear 960, which, in turn, rotates the collet. Since the base 950 is rotationally fixed, the tab 960 secures the spindle gear 930, preventing the rotation of the spindle 905. The collet nut 910, however, rotates, since the rotation of the control gear 965 (created by the tool rotation) is transferred to the collet nut 910. As a result, the collet nut 910 moves axially along the spindle 905, collapsing and expanding the collet 915, securing or releasing a bit shank within the collet.

Figure 10A:
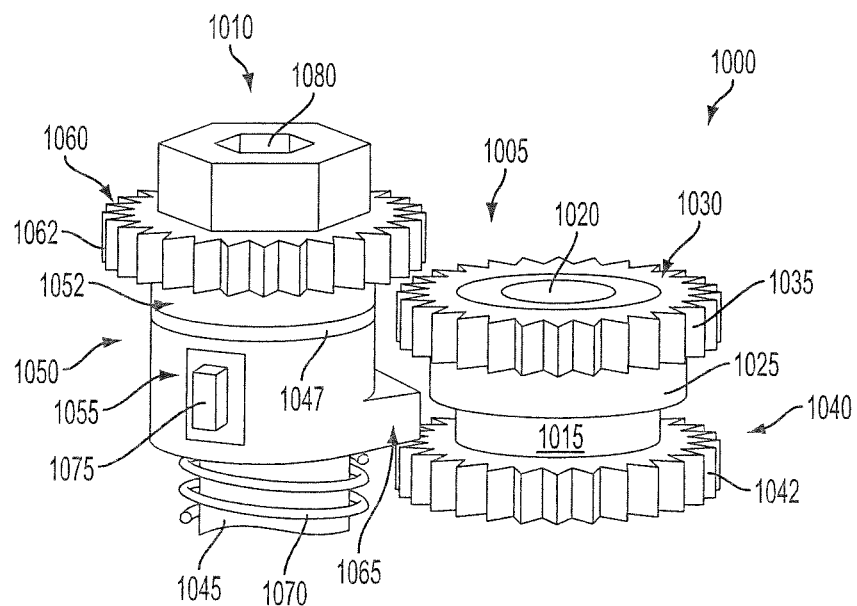
FIGS. 10A and 10B illustrate isolated views of a bit retaining system in accordance with another embodiment of the invention.
Figure 10B:
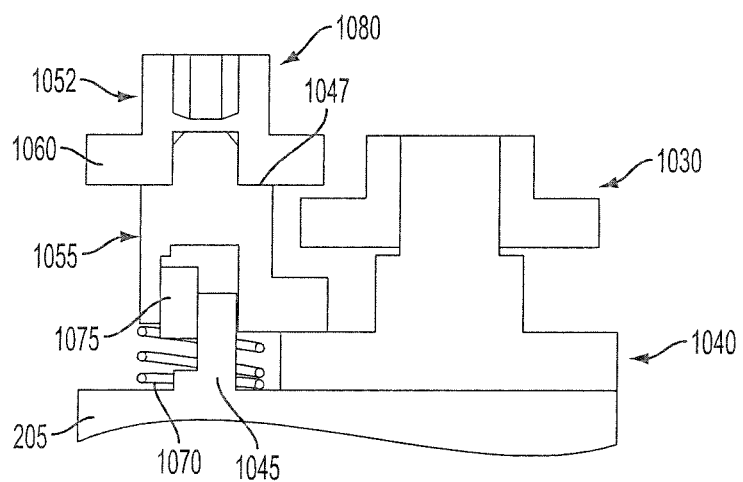
Figure 11:
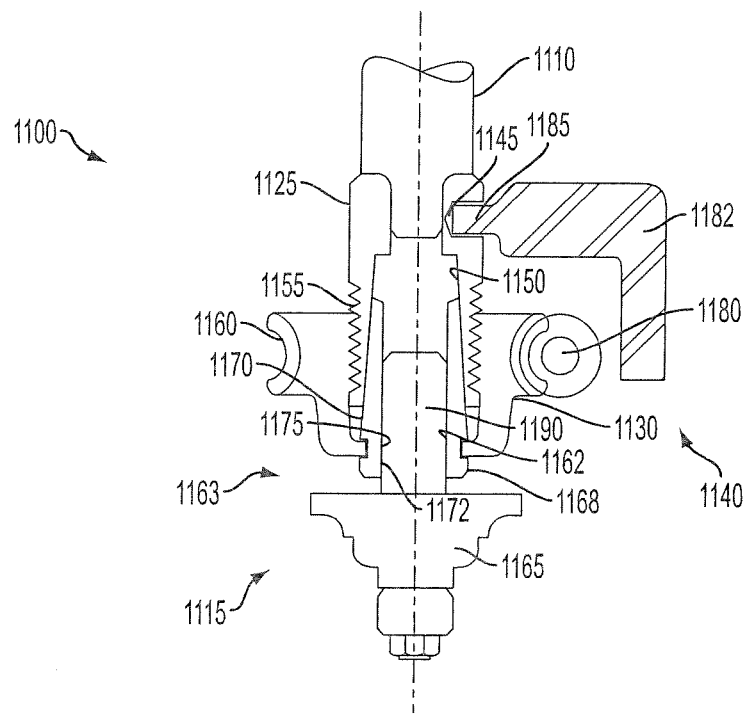
FIG. 11 illustrates isolated views of a bit retaining system in accordance with another embodiment of the invention.

FIGS. 10A and 10B illustrate a bit retaining system in accordance with another embodiment of the invention. The bit retaining system 1000 is a single spur gear configuration including a collet assembly 1005 and a control assembly 1010. The collet assembly 1005 includes a spindle 1015 with a collet 1020, as well as a collet nut 1025 that threadingly engages the spindle in a manner similar to that described above. As a result, the axial movement of the collet nut 1025 along the spindle 1015 (caused by the rotational movement between the collet nut and the spindle) selectively expands and collapses the collet 1020 to engage/disengage the shank of a bit. A collet gear 1030 may be attached or integrated into the collet nut 1025. The collet gear 1030 may be in the form of a spur gear including a plurality of teeth 1035 extending radially from collet nut and spaced about the collet nut circumference.

The collet assembly 1005 further includes a spindle gear 1040 attached or otherwise integrated into the spindle 1015, disposed at a location that is axially spaced from the collet gear 1030. The spindle gear 1040 may be in the form of a generally annular spur gear having a plurality of teeth 1042 extending radially from the spindle 1015 and spaced about the spindle perimeter. With this configuration both the upper collet gear 1030 and the lower spindle gear 1040 rotate as the spindle is rotated by the motor.

The control assembly 1010, adjacent the collet assembly 1005, includes a generally cylindrical shaft 1045 including a carriage 1050 adapted to move axially along the shaft. The carriage 1050 includes a first or upper section 1052 and a second or lower section 1055. The sections 1052, 1055 are constrained axially to one another along a friction surface. The upper section 1052 includes a control gear 1060 that is free to rotate about the axis of the carriage 1045. The control gear 1060 may be in the form of a spur gear including a plurality of teeth 1062 extending radially from the carriage 1050. The lower section 1055, furthermore, includes at least one tab or gear tooth 1065 extending radially from the carriage 1050.

The carriage 1050 is biased in a normal position (e.g., biased such that the carriage is spaced from the motor housing) by a biasing member 1070 such as a spring. In particular, the biasing member 1070 positions the carriage 1050 such that, in the carriage normal position, neither the control gear 1060 nor the tab 1065 are meshed with the collet gear 1030 or the spindle gear 1040, respectively. That is, in the normal position, the control gear 1060 disposed on the first section 1052 of the carriage 1050 is not in the same plane as the collet gear 1030. Similarly, the tab 1070 disposed on the second section 1055 of the carriage 1050 does not lie in the same plane as the spindle gear 1040.

The control assembly 1010 is configured such that urging the carriage 1050 axially toward the motor housing (downward from the perspective of FIG. 10A) overcomes the biasing force of the biasing member 1070 and aligns the control gear 1060 with the collet gear 1030 and the tab 1065 with the spindle gear 1040 (discussed in greater detail below).

The lower section 1055 of the carriage 1050 may further include an internal key 1075 that permits limited rotation of the lower section with respect to the shaft 1045. With this configuration, the tab 1065 of the lower section 1050 is adapted to rotate by only the angle necessary to mesh it with the spindle gear 1040. By way of example, the rotation of the lower section 1055 about the shaft 1045 may be limited to about less than 10 degrees. By way of further example, the lower section 1055 may rotate the angle of one gear tooth. The friction surface 1047 between the upper section 1052 and the lower section 1055 transmits torque applied to the upper section through to the lower section in order to align the tab 1065 on the lower section with the spindle gear 1040 on the spindle 1015. With this configuration, the substantial rotation of the spindle 1015 is prevented, but the tab 1070 may be slightly adjusted to position the tab in meshed engagement between adjacent teeth 1042 on the spindle gear 1040.

The control assembly 1010 further includes a socket 1080 adapted to mate with a tool operable to apply torque (e.g., an Allen wrench). With this configuration, the socket 1080 could be used to apply torque to the control gear 1060 and tab 1065. Specifically, once the biasing member 1070 is compressed and the gears 1030, 1040, 1060, 1065 of each assembly 1005, 1010 are aligned/meshed, torque may be applied to the upper section 1052 of the control assembly 1010.

In operation, the control assembly 1010 begins in its normal position, in which the control gear 1060 and the tab 1065 are not meshed with the collet gear 1030 and the spindle gear 1040, respectively. A tool is axially inserted into the socket 1080 to seat the tool onto the socket key. The tool drives the carriage 1050 axially along the shaft 1045 until the gears become aligned. If necessary, the lower section 1055 automatically rotates slightly to align the tab 1062 in meshed engagement with the teeth 1042 of the spindle gear 1040. Alternatively, a user may manually rotate the tool to align the gears. Rotating the tool causes the first section 1052 to rotate. The second section 1055, however, rotationally fixes the spindle 1015 as a result of the meshed engagement between the tab 1065 and the spindle gear 1040. Thus, the collet nut 1025 rotates, while the spindle 1015 is held rotationally in position. This axially moves the collet nut 1025 along the spindle 1015, opening and closing the collet 1020 to capture or release the bit (as described above).

FIGS. 11-14 illustrate a rotary tool bit retaining system in accordance with another embodiment of the invention. The bit retaining system 1100 includes a bit holder 1115 secured to a spindle 1110 at one end, and which, in turn, secures a tool bit 1165 at an opposite end. The bit holder 1115 includes a threaded housing 1125, a wedged collet 1168, a threaded worm nut 1135, and a worm actuator 1140. The threaded housing 1125 may be a generally cylindrical member that is releasably connectable to spindle 1110. The spindle 1110 includes a first/upper portion including a lock recess 1145 that engages the worm actuator 1140 and a second/lower portion having an internal surface 1150 that tapers inward in the direction away from spindle 1110. The outer surface of the second/lower portion of the spindle 1110 is threaded.

The threaded worm nut 1135 includes an inner threaded bore 1155 and wormed gears 1160 on an outer/upper surface. A lower inner surface of the threaded worm nut 1135 includes an inwardly directed projection 1162 for engaging wedged collet 1168. The wedged collet 1168 is generally cylindrically shaped with an outer tapered surface 1170 that is tapered in a direction toward spindle 1110. The outer tapered surface 1170 is disposed opposite inner lock surface 1172 of wedged collet 1168. The wedged collet 1168 also includes an outwardly facing recess 1175 in its outer surface, which is engaged by the projection 1162 of threaded worm nut 1135. The wedged collet 1130 also includes an inner lock surface 1172 against which a tool bit 1115 is frictionally secured.

Figure 12:
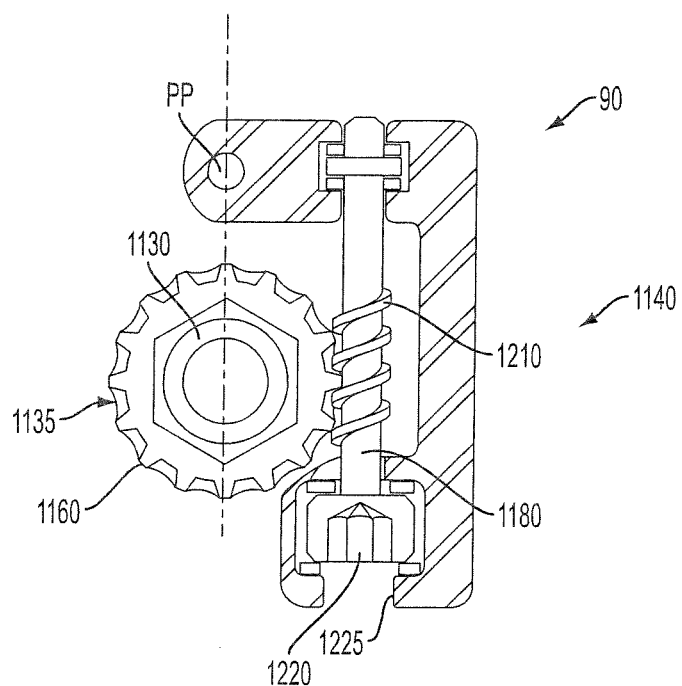
FIG. 12 illustrates a worm actuator of the bit retaining system as shown in FIG. 11.
Figure 13:
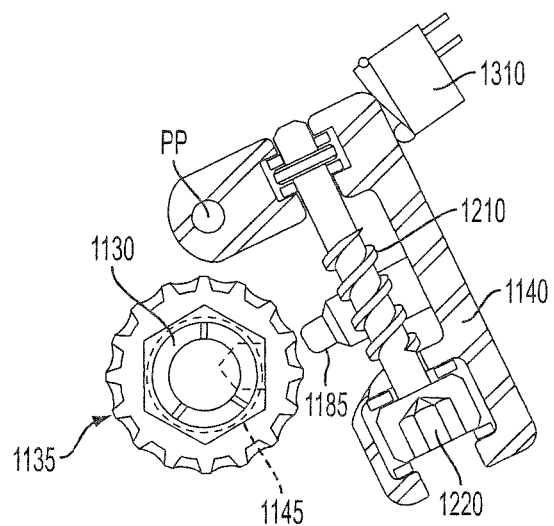
FIG. 13 illustrates a worm actuator of the bit retaining system as shown in FIG. 11, in a disengaged arrangement.

The worm actuator 1140 includes a worm 1180 and a lock support 1182 and is pivotally secured to the rotary tool (e.g., a router (not shown)) via a pivot pin PP (seen best in FIG. 12). The worm actuator 1140 is engaged with the threaded worm nut 1135. FIG. 13 shows the worm actuator 1140 in a disengaged arrangement. A safety switch 1310 may be employed to ensure that the router motor can only be energized when worm actuator 1140 is in its disengaged position. For example, in one embodiment, the safety switch 1310, 1320 may be closed in the disengaged position of worm actuator 1140. One or more switches may be used in various ways to employ this safety feature.

Referring back to FIG. 11, the lock support 1182 may also include a lock projection 1185 for projecting into the lock recess 1145 of the threaded housing 1125. The function of the lock projection 1185 will be discussed below.

Figure 14:
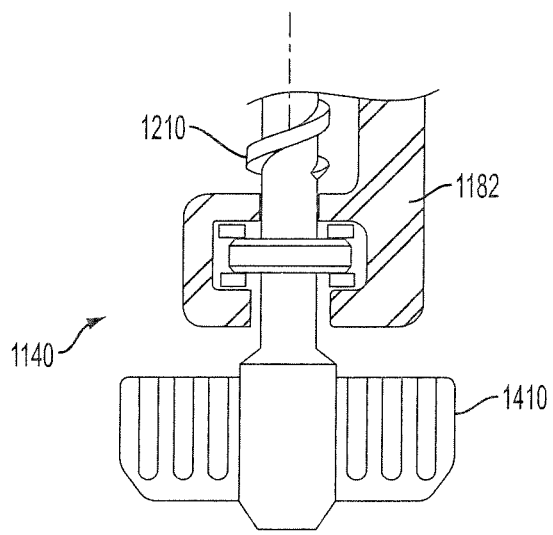
FIG. 14 illustrates a variation of a worm actuator of the bit retaining system as shown in FIG. 11.

Referring to FIG. 12, the worm 1180, which includes a plurality of worm teeth 1210, is rotatably positioned on lock support 1182. The worm 1180 may include a shaped recess 1220 exposed in an opening 1225. A tool can be inserted into shaped recess 1220 and the user can turn the tool to rotate worm 1180. Alternatively, as shown in FIG. 14, the worm 1180 may include a keyless hand turnable member 1410 such as a knob. In operation, a user simply turns the hand turnable member 1410 to rotate worm 1180.

Referring back to FIG. 11, the tool bit 1163 includes a blade 1165 and a shaft 1190. The shaft 1190 is received in the inner lock surface 1172 of the wedged collet 1130.

In operation, a user inserts shaft 1190 of tool bit 1163 into wedged collet 1168. The user then insures that worm actuator 1140 is in the engaged position (FIG. 2). When the worm actuator 1140 is in the engaged position, the worm teeth 1210 engage gears on threaded worm nut 1135. The user then rotates worm 1180 by inserting a tool into shaped recess 1220 or by rotating keyless hand turnable member 1410. As a result, the threaded worm nut 1135 rotates about the router's central rotational axis relative to worm 1180. To insure that the inner threads of threaded worm nut 1135 will rotate relative to the outer threads of threaded housing 1125 against friction between the threads, the lock projection 1185 is employed. In the engaged position, the lock projection 1185 is received into and interlocks with the lock recess 1145 of threaded housing 1125. Because the worm actuator 1140 is not rotatable about the same axis as that of the spindle 1110, this interlock prevents rotation of spindle relative to the rotor and, as such, prevents the same-direction rotation of threaded worm nut 1135 and the threaded housing 1125.

As inner threads of threaded worm nut 1135 rotate relative to the outer threads of the threaded housing 1125, the threaded worm nut moves axially along the spindle 1110, toward the router. Because the inwardly directed projection 1185 engages outwardly facing recess 1175, wedged collet 1130 also axially translates in the direction of spindle 1110. As the outer tapered surface 1170 of wedged collet 1130 slides along the inner tapered surface 1150 of threaded housing 1125, the inner lock surface 1172 of the wedged collet 1130 moves toward the central axis of router spindle 1110. This inner surface contacts the shaft 1190 of the tool bit 1163 to secure the tool bit in a manner that is axially aligned with router spindle 1110.

While the present invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

We claim:

1. A bit retaining system for retaining a bit in a rotary tool, the system comprising:
    a collet assembly including:
        a spindle operable to rotate about a spindle axis, the spindle comprising an internal channel and having a threaded external surface,
        a collet operable to receive a shank of the rotary tool bit disposed within the internal channel, the collet configured to move axially with respect to the spindle,
        a collet nut in threaded engagement with the external thread of the spindle, the collet nut restricting the axial movement of the collet with respect to the spindle, the collet nut having a plurality of gear teeth that define a collet gear; and
        a spindle gear longitudinally spaced from the collet gear along the spindle axis, the spindle gear and collet gear being coaxial with the spindle, the spindle gear having a plurality of teeth disposed about a circumference of the spindle; and
    a control assembly including:
        a control gear having a control gear axis oriented orthogonal to the spindle axis, the control gear adapted to selectively engage the spindle gear and the collet gear by moving laterally along the control gear axis from a first, disengaged position, in which the control gear is disengaged from the spindle gear and the collet gear, to a second, engaged position, in which the control gear is engaged with the spindle gear and the collet gear,
    wherein, when the control gear is in its second position, a rotary force applied to the control gear causes a corresponding rotation of the collet gear and spindle gear to drive the collet nut axially along the spindle.

2. The bit retaining system of claim 1, wherein the control gear comprises a head portion having teeth that engage the teeth of the spindle gear and the teeth of the collet gear, a shaft extending from the head portion, and a socket disposed at an end of the shaft, the socket being configured to receive an operable tool.

3. The bit retaining system of claim 2, wherein in the disengaged position, the teeth of the head portion are not meshed with the teeth of the spindle gear and the teeth of the collet gear.

4. The bit retaining system of claim 2, wherein, in the engaged position, the teeth of the head portion are meshed with the teeth of the spindle gear and the teeth of the collet gear.

5. The bit retaining system of claim 2, further comprising a biasing member wrapped around an intermediate portion of the shaft.

6. The bit retaining system of claim 5, wherein in the disengaged position, the biasing member biases the control gear away from the spindle axis, allowing the spindle to rotate.

7. The bit retaining system of claim 5, wherein the operable tool is inserted axially into the socket along the control gear axis to apply a force to the control gear that overcomes a biasing force of the biasing member to drive the control gear until the teeth on the head portion are in meshed engagement with the teeth of the spindle gear and the teeth of the collet gear, respectively.

8. The bit retaining system of claim 2, wherein rotation of the operable tool rotates the control gear about the control gear axis and causes the spindle gear and collet gear to rotate in opposite directions about the spindle axis, and the spindle is rotated in a first direction and the collet nut is rotated in an opposite direction to drive the collet nut along the spindle.

9. The bit retaining system of claim 2, wherein the operable tool comprises a hex wrench.

10. The bit retaining system of claim 2, wherein:
    the operable tool comprises a hand operated tool that mates with the socket of the hand operated tool.

11. The bit retaining system of claim 1, wherein the control gear is in the form of a bevel gear.

* * * * *